United States Patent [19]

Ishimoto et al.

[11] 4,188,809
[45] Feb. 19, 1980

[54] APPARATUS FOR DETECTING THE SHAPE OF A STRIP

[75] Inventors: Masaki Ishimoto; Toshiyuki Kajiwara, both of Hitachi, Japan

[73] Assignee: Hitachi, Ltd., Tokyo, Japan

[21] Appl. No.: 891,208

[22] Filed: Mar. 29, 1978

[30] Foreign Application Priority Data

Mar. 30, 1977 [JP] Japan .................................. 52-34439

[51] Int. Cl.² ........................ B21B 37/00; G01L 5/04; G01L 5/10
[52] U.S. Cl. ........................................ 72/17; 72/34; 73/159
[58] Field of Search ........................... 72/6–12, 72/17, 21; 73/159, 144

[56] References Cited

U.S. PATENT DOCUMENTS

| | | | |
|---|---|---|---|
| 3,499,306 | 3/1970 | Pearson | 72/17 |
| 3,688,571 | 9/1972 | Atkins et al. | 73/159 X |
| 3,902,363 | 9/1975 | Ishimoto | 73/159 |
| 4,054,043 | 10/1977 | Eibe | 72/6 |

Primary Examiner—Milton S. Mehr
Attorney, Agent, or Firm—Thomas E. Beall, Jr.

[57] ABSTRACT

Apparatus wherein a plurality of rings disposed in the direction of the width of a strip are pressed against the surface of the strip being rolled, and the distribution in the direction of the width, of the components of the tension of the strip as act on the respective rings is detected, thereby to detect the shape of the strip, characterized in that a plurality of cylindrical springs are fitted in the interspace between the inner periphery of each ring and the outer periphery of a shaft which rotates along with the rings, and that a gap sensor which detects the amount of eccentricity of the corresponding ring attributed to the component of the tension of the strip is arranged in the vicinity of the outer periphery of each ring.

6 Claims, 15 Drawing Figures

APPARATUS FOR DETECTING THE SHAPE OF A STRIP

BACKGROUND OF THE INVENTION

1. Field of the Invention

This invention relates to apparatus for detecting the shape of a strip being rolled. More particularly, it relates to apparatus wherein a plurality of rings disposed in the direction of the width of a strip are pressed against the strip so as to detect the flatness of the strip in the direction of the width.

2. Description of the Prior Art

In the cold rolling, the flatness of a strip is an important matter of interest. As the final product of the rolled strip is thinner, the control of the flatness of the strip or the shape control is a more serious problem to be solved.

As regards an uneven rolled strip under the state under which no tension is exerted, the unevenness of the strip can be easily found by sight. However, under the state under which a tension acts on a strip as in course of rolling, the unevenness of the strip is stretched and cannot be visually found. Accordingly, there have heretofore been developed various shape detectors which detect the shape of a strip continuously in the state in which the strip is subjected to a tension and in which it is running.

As an example, a shape detector has been known in which a plurality of rings disposed along the width of a strip are pressed against the strip, the components of the tension of the strip as act on the respective rings are measured, and the shape of the strip is detected from the tensile distribution state of the strip in the direction of the width thereof.

This shape detector is based on the principle that, in the tensioned state, the shape or unevenness of the strip appears as non-uniformity in the distribution of the tensile components of the strip in the direction of the width of the strip, so the shape can be detected by measuring the tensile distribution.

As a typical example of the shape detector of such a type having the allocated rings, there is one wherein a plurality of rings are rotatably fitted on a shaft transverse to a strip through roller bearings and wherein the components of the tension of the strip as act on the respective rings are detected by load cells disposed between the roller bearing and the shaft (refer to, for example, U.S. Pat. No. 3,902,363). This shape detector, however, requires the roller bearing on the inner periphery of each ring in order to ensure a smooth rotation between the ring and the shaft. In general, the roller bearing has a play of several tens to several hundreds microns however precisely it is fabricated. On the other hand, a flatness of several tens microns is required for the shape of the strip. Accordingly, even when the tensile components are measured with the load cells of high precision, essentially the shape of the strip is not assessed on account of the play of the roller bearing.

Further, the surface of the ring held in contact with the strip throughout undergoes abrasion due to its friction with the strip or flaws due to the flaws or fine uneven parts of the surface of the strip, and it needs to be polished frequently. Since, however, the roller bearing is contained on the inner periphery of the ring as stated previously, the ring surface will be eccentrically polished on account of the play of the roller bearing if it is polished by rotating the ring as fitted on the shaft.

Further, the plurality of load cells are disposed inside each ring. Since the load cell requires a load detecting capability of high precision, it needs a favorable atmosphere of measurement and is very expensive, and besides, it is less immune to an impact load. Notwithstanding that a routine insepection is accordingly necessary, the overhaul of the load cell is troublesome as it is assembled inside the ring.

On the other hand, there has been developed a shape detector which employs neither load cells nor roller bearings and in which a pressurized fluid is caused to flow between a shaft and rings so as to ensure the smooth rotation between the shaft and the rings by means of a fluid film formed of the fluid, while on the basis of the fact that the fluid pressures between the respective rings and the shaft are proportional to tensile components, the fluid pressures are detected so as to effect the shape detection (U.S. Pat. No. 3,499,306).

Also in this detector, however, means for sensing the pressures of the fluid need to be contained in the shaft. Moreover, the fluid is spouted towards the rings from fine nozzles provided in the shaft, and hence, such care as removal of dust in the fluid must be taken into consideration.

The most desirable shape detector is one which, of course, has a high capability of detecting a shape, in which a play occurring in a rotary part is little, which does not employ expensive load cells, and which does not include load cells requiring maintenance therein and is simple in overhaul and maintenance.

SUMMARY OF THE INVENTION

An object of this invention is to provide a shape detector which is capable of a shape detection of high precision and which is simple in structure and low in price.

The characterizing feature of this invention consists in that a plurality of rings are fitted through spring means on the outer periphery of a shaft rotatably supported at both its ends, and that the components of the tension of a strip are converted into the eccentric quantities (with respect to the axis of the shaft) of the rings caused by the flexures of the spring means, the eccentric quantities being detected by gap sensing means arranged near the outer peripheries of the rings, thereby to detect the shape of the strip.

PREFERRED EMBODIMENTS OF THE INVENTION

Figure 1:
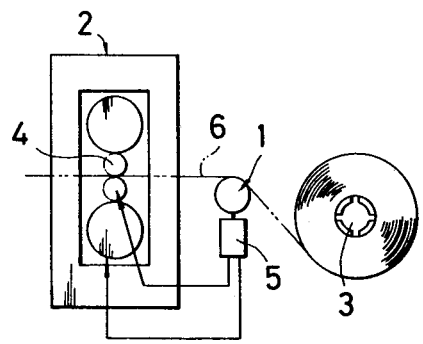
FIG. 1 is a side view of a strip mill employing a shape detector of this invention.

FIG. 1 shows an example in which a shape detector 1 is arranged between a rolling mill 2 and a winder 3. A strip 6 rolled between rolls 4 of the rolling mill 2 is taken up on the winder 3 while holding a tension. Under the state under which the shape detector 1 is pressed against the strip 6, it detects the distribution situation of the components of the tension in a direction orthogonal to the flow of the strip 6. The detected signal is converted into a shape signal by an arithmetic unit 5, the latter signal being used for the shape control of the strip as an input of the rolling-reduction control or the bending-force control.

Figure 2:
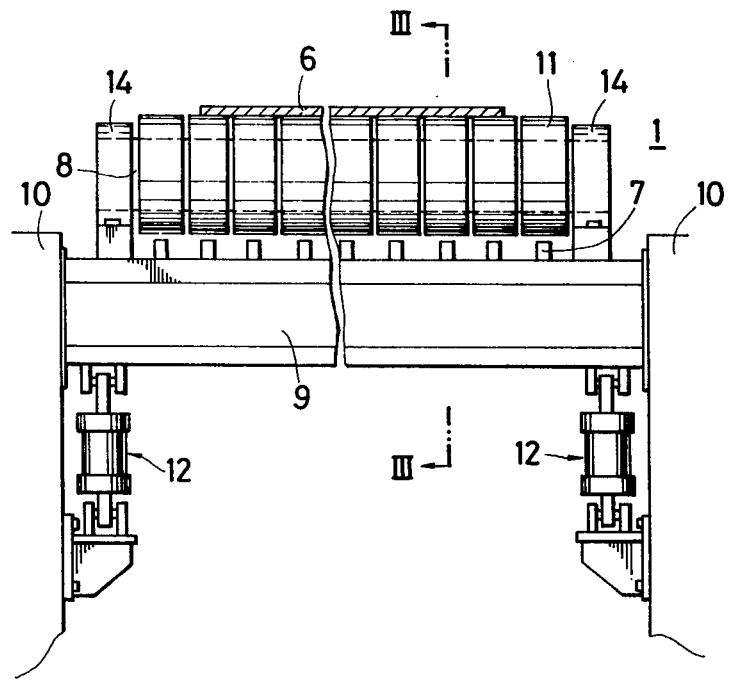
FIG. 2 is a front view of the shape detector of a first embodiment of this invention.

Hereunder, a first embodiment of the shape detector of this invention will be described in detail with reference to FIGS. 2 and 3. As shown in FIG. 2, the shape detector 1 is fixed between guide frames 10 and on a vertically moving frame 9 which can ascend and descent through hydraulic cylinders 12. A shaft 8 is rotatably supported at its both ends by roller bearings 14 which are fixed to the vertically moving frame 9. Around the outer periphery of the shaft 8, there are fitted a large number of rings 11 which are rotatable along with the shaft 8 and the adjacent ones of which have a predetermined spacing therebetween. The running strip 6 is taken up while rotating the rings 11 and the shaft 8 by being in contact with the outer peripheries of the rings 11. On the other hand, gap sensors 7 equal in number to the rings 11 are fixed on the ascending and descending frame 9 on that side of the rings 11 on which they are not in contact with the strip 6, that is, under the rings 11 as viewed in FIG. 2.

Figure 3:
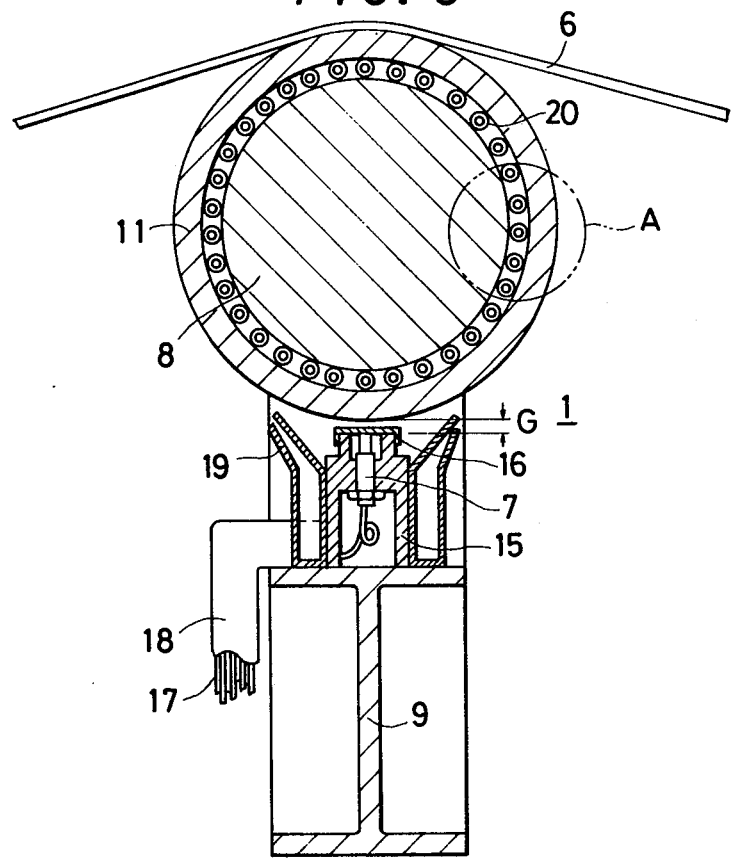
FIG. 3 is a sectional view taken along III—III in FIG. 2, FIGS. 4 and 5 are signal flow charts of shape detectors of this invention.

Referring now to FIG. 3, the gap sensor 7 is threadably inserted in a holder 15 underneath the ring 11 with such an extent of gap G that it does not contact with the ring 11. A cap 16 is put on the top part of the holder 15 in order to prevent the gap sensor 7 from being stained. In addition, the top part is filled with cooling water for cooling the gap sensor 7. A signal wire 17 for the gap sensor 7 is led out at a lower part of the holder 15, and the signal wires of the respective sensors are collected and are externally guided from a duct 18. Nozzles 19 which are open in directions tangential to the outer periphery of the ring 11 are disposed on both sides of the holder 15, and serve to blow off scales etc. adherent to the outer peripheral surface of the ring 11.

On the other hand, a large number of cylindrical springs 20 which are made up of cylindrical pipes are fitted between the ring 11 and the shaft 8 and in a direction parallel to the axis of the shaft 8. The sectional shape of the cylindrical spring 20 in a direction orthogonal to the axis is flexed into an ellipse by the component of the tension of the strip as acts on the ring 11. The quantity of flexure is linearly proportional to the component of the tension. Therefore, when the quantities of flexures or the gaps between the gap sensors 7 and the rings 11 are detected by the gap sensors 7, the state of distribution in the direction of the width of the strip, of the components of the tension of the strip as act on the respective rings 11 can be detected.

Figure 4:
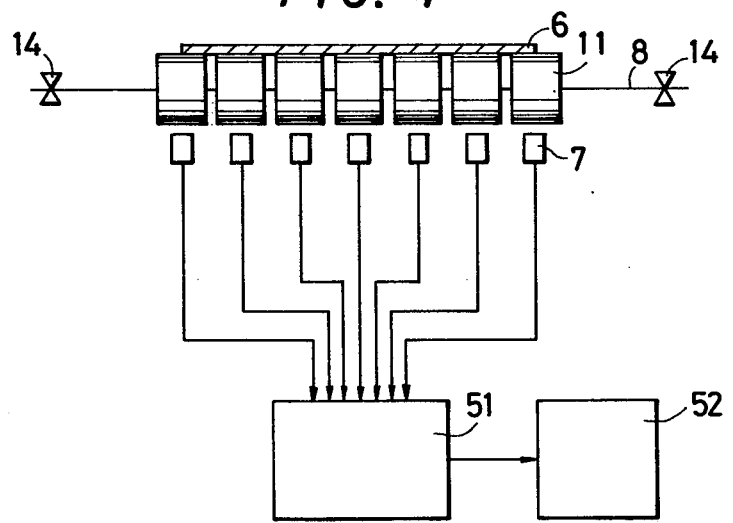

That is, as illustrated in FIG. 4, the principle of the shape detector of this invention is such that the difference of the tension attributed to the unevenness of the strip is converted into the quantity of flexure of the spring means interposed between the ring 11 and the shaft 8, that the quantity of flexure is subsequently grasped as the quantity of eccentricity of the ring 11 from the axis of the shaft 8, and that the quantity of eccentricity is detected as the quantity of change of the distance between the gap sensor 7 and the outer peripheral surface of the ring 11. The signals of the respective gap sensors 7 detected in this way are collected to an arithmetic unit 51, from which a shape is transmitted to a rolling control device 52.

In this manner, the shape detector of this invention does not include any means causing a play, such as the roller bearing and the film bearing, between the ring 11 which contacts with the strip and the shaft 8 which supports the ring 11, so that the shape detection of high precision is possible. Moreover, no load cell is contained in the ring which requires maintenance and inspection, so that the structure is simple and that the overhaul can be easily performed.

Figure 5:
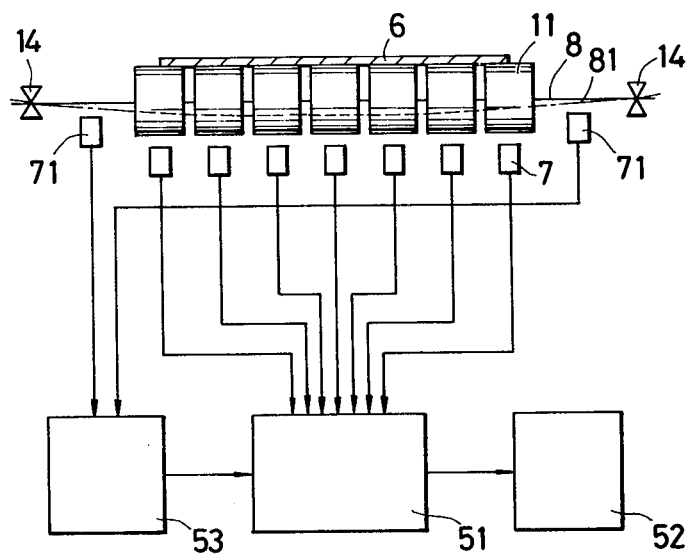

FIG. 5 shows an embodiment of this invention which has means for correcting an error ascribable to the flexure or eccentricity of the shaft. The shaft 8 penetrating the rings 11 should desirably be made a diameter ensuring such an extent of rigidity that the shaft does not bend even when subjected to the tension of the strip. From the viewpoint of the precision of the shape detection, however, it is subject to a limitation to enlarge the outside diameter of the ring 11. Accordingly, the diameter of the shaft 8 inevitably has an upper limit, and the flexure of the shaft as shown at a dotted line 81 in FIG. 5 is unavoidable. The roller bearing 41 which rotatably supports either end of the shaft 8 undergoes some extent of play, which becomes a cause for the eccentric motion of the shaft. In the present embodiment, therefore, a pair of gap sensors 71 are disposed inside the roller bearings 14 at both the ends of the shaft 8 so as to detect the quantity of eccentricity and the quantity of flexure of the shaft 8. On the basis of the quantity of eccentricity and the quantity of flexure of the shaft 8 detected by the gap sensors 71, the quantity of flexure of the shaft 8 in the direction of the width of the strip is calculated in reliance on the strength of materials by an airthmetic unit 53. It is subtracted from the signal from each gap sensor 7 in the airthmetic unit 51. Thus, the true unevenness of the strip with the eccentricity or flexure of the shaft 8 removed from the signals of the gap sensors 7 can be detected.

Figure 6:
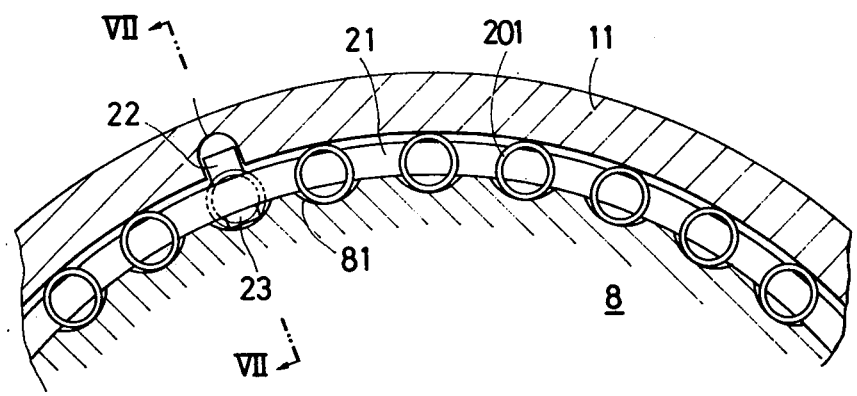
FIG. 6 is an expanded view of a part A in FIG. 3.
Figure 7:
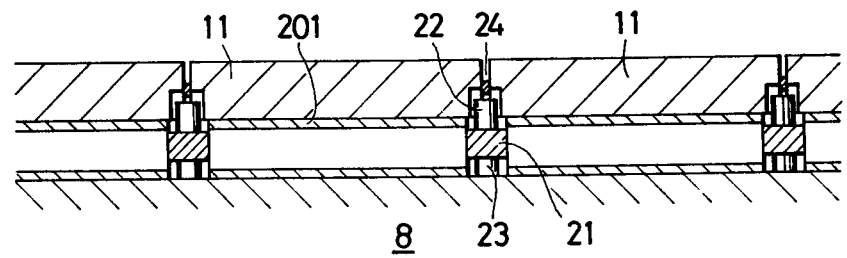
FIG. 7 is a sectional view taken along VII—VII in FIG. 6.

FIGS. 6 and 7 illustrate a first embodiment of the spring means 20 in detail. In the present embodiment, the spring means comprises metallic cylindrical springs 201 which have equal diameters and wall thicknesses. The cylindrical spring 201 is received in a groove 81 which is provided in the outer peripheral surface of the shaft 8 in a manner to extend axially. The groove 81 is sufficiently shallower than the diameter of the cylindrical spring 201. The cylindrical spring 201 simultaneously contacts with the inner peripheral surface of the ring 11. The number of the cylindrical springs 201 lying in axial alignment is equal to that of the rings 11. A spacer ring 21 is disposed between the adjacent ones of the axially aligned cylindrical springs so as to prevent them from contacting with each other. The spacer ring 21 is arranged so as to surround the shaft 8, and has protuberances 22 and 23 at parts thereof. The protuberances 22 and 23 serve to support the spacer ring 21 so as not to rotate relative to the ring 11 and the shaft 8, and are respectively in a recess 111 in the ring 11 and the recess 81 in the shaft 8. Another spacer ring 24 is inserted between the adjacent ones of the rings 11.

Figure 8:
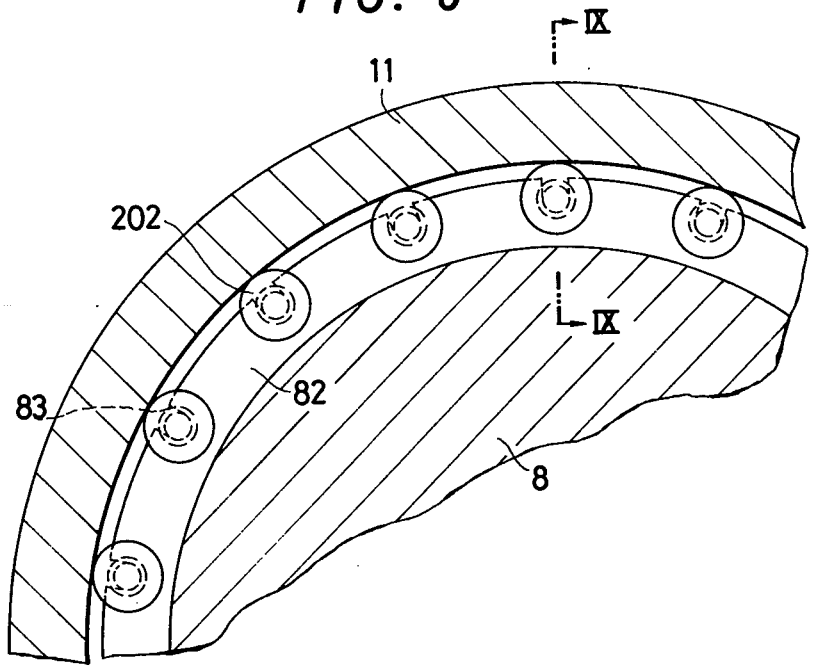
FIG. 8 shows a second embodiment of this invention, and is an expanded view of the part A in FIG. 3.
Figure 9:
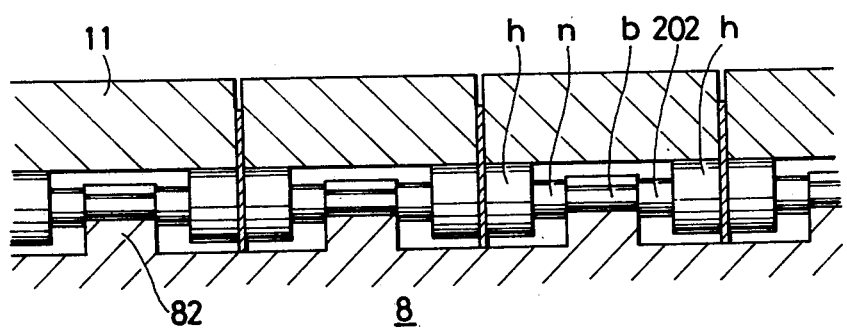
FIG. 9 is a sectional view taken along IX—IX in FIG. 8.

As the spring means, various structures are applicable. FIGS. 8 and 9 show a second embodiment of this invention which employs a stepped solid axle as the spring means. The outer periphery of the shaft 8 is provided with projections 82 at positions opposing to the rings 11, and U-shaped recesses 83 are formed in each projection 82. The stepped solid shaft 202 consists of head parts h having a large diameter, a central part b having a small diameter, and neck parts n situated between the head parts h and the central part b. The central part b of the solid shaft is received in the groove 83, and is supported by the bottom of the recess 83. On the other hand, the head parts h lie in contact with the ring 11. Here, when the component of the tension of the strip acts on the ring 11, the solid shaft 202 flexes, so that the ring 11 becomes eccentric with respect to the axis of the shaft 8.

Figure 10:
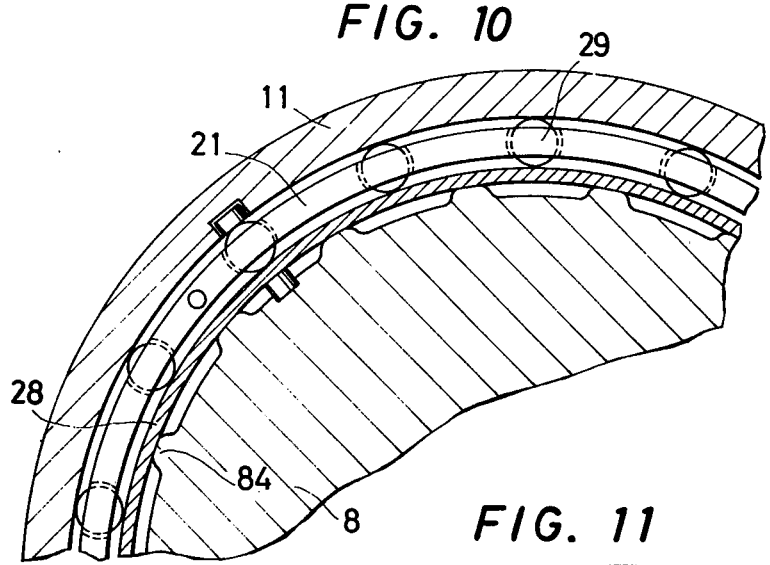
FIG. 10 shows a third embodiment of this invention, and is an expanded view of the part A in FIG. 3.

FIG. 10 shows a third embodiment of the spring means. The outer periphery of the shaft 8 is provided with a plurality of protrusions 84 extending axially, and a ring 28 is fitted so as to lie in contact with the protrusions 84. Cylindrical shafts 29 are arranged on the outer periphery of the ring 28 and at positions out of alignment with the projections 84. When the component of the tension of the strip acts on the ring 11, the ring 28 is deformed through the shafts 29 lying in contact with the ring 11, so that the ring 11 becomes eccentric relative to the axis of the shaft 8 to an amount corresponding to the component of the tension. As in the emodiment of FIG. 6, the shafts 29 are fixed by the spacer ring 21.

Figure 11:
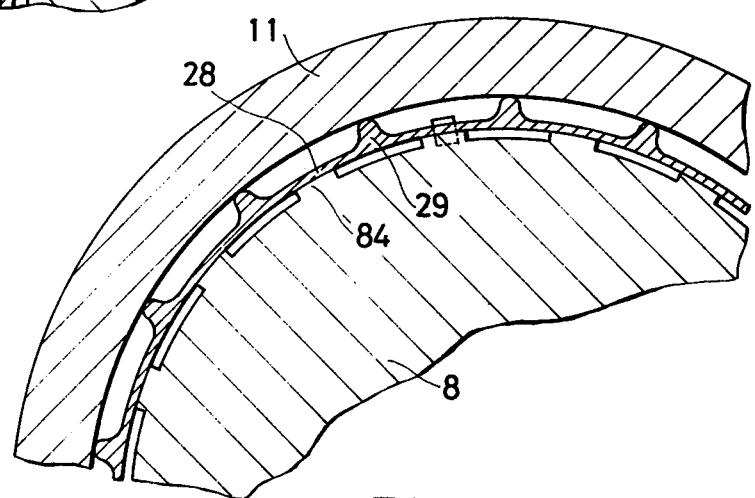
FIG. 11 shows a fourth embodiment of this invention, and is an expanded view of the part A in FIG. 3.

FIG. 11 shows a fourth embodiment of the spring means. The shaft 8 is provided with protuberances 84 as in the embodiment of FIG. 10. On the outer peripheries of the protuberances 84, there is fitted a ring 28 which has protrusions 29 protruding at positions out of alignment with the protuberances 84. The protrusions 29 of the ring 28 lie in contact with the inner periphery of the ring 11. Accordingly, when the component of the tension of the strip is exerted on the ring 11, the ring 28 is deformed, and the ring 11 becomes eccentric relative to the axis of the shaft 8 to an amount corresponding to the component of the tension. Likewise to the embodiment of FIG. 10, the ring 28 is fixed by appropriate means lest the relative positional relations with the shaft 8 and the ring 11 should change.

Figure 12:
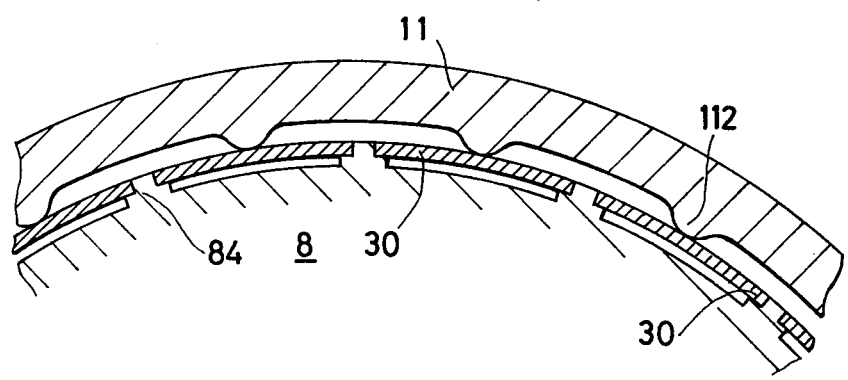
FIG. 12 shows a fifth embodiment of this invention, and is an expanded view of the part A in FIG. 3.

FIG. 12 shows a fifth embodiment of the spring means. As in the embodiments of FIGS. 10 and 11, the shaft 8 is provided with a plurality of protuberances 84 in the axial direction. A plate 30 made of an elastic material is fitted between the adjacent protuberances 84. Projections 112 of the ring 11 are formed at positions opposing to the outer peripheral surface of the respective plates 30. Accordingly, when the component of the tension of the strip acts on the outer periphery of the ring 11, a load is exerted on the plate 30 through the projection 112 and the plate 30 flexes. Due to the flexure of the plate, the ring 11 becomes eccentric with respect to the axis of the shaft 8 to an amount corresponding to the component of the tension of the strip.

As described above, various structures are thought out as the spring means. Essentially, the spring means may be any structure which is interposed between the ring 11 and the shaft 8 and which bestows a predetermined amount of eccentricity on the ring 11 in correspondence with a load acting on the ring 11.

Figure 14:
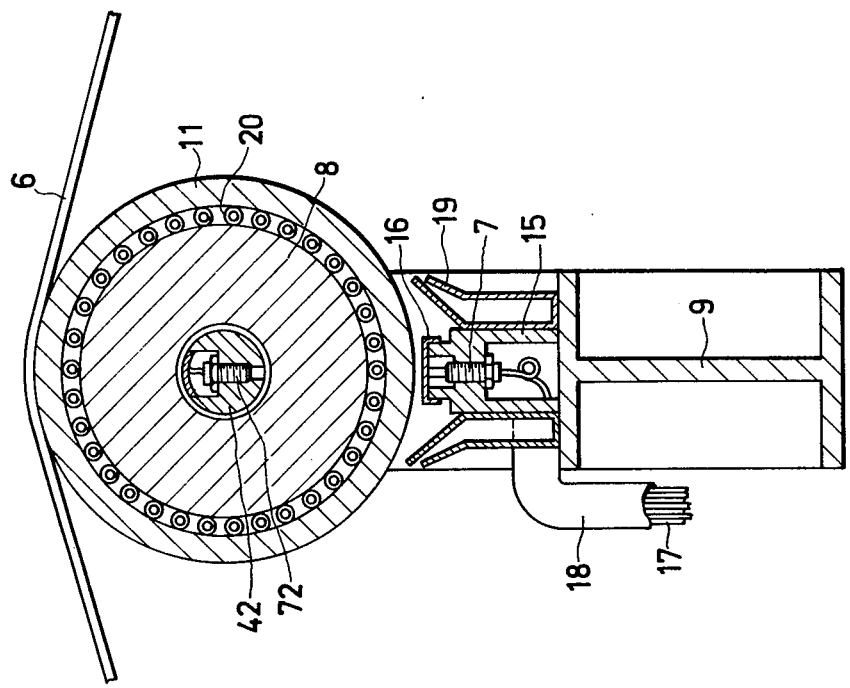
FIG. 14 is a sectional view taken along XIV—XIV in FIG. 13.
Figure 13:
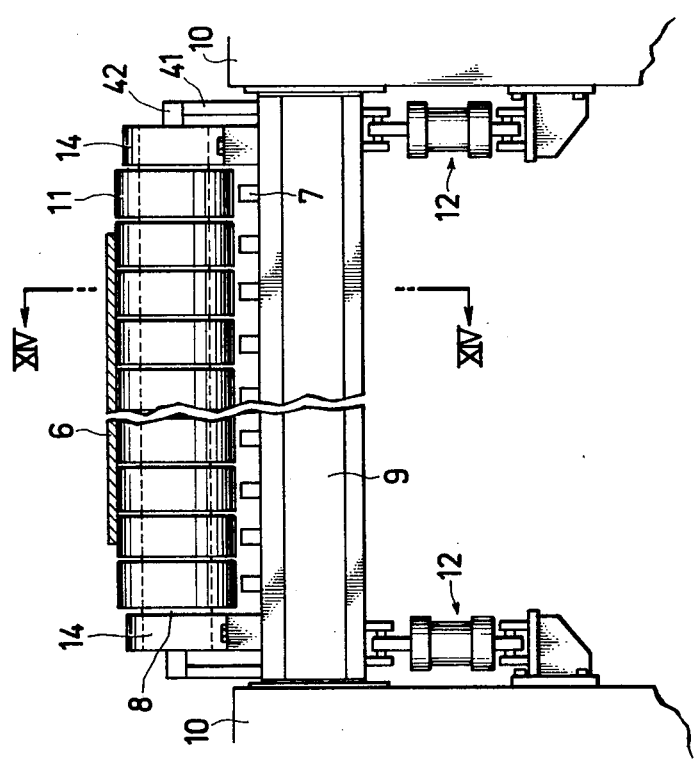
FIG. 13 is a front view of a shape detector which is a sixth embodiment of this invention.

Shown in FIGS. 13 and 14 is an embodiment wherein, in order to correct a detection error attributed to the flexure of the shaft 8, the shaft 8 is made hollow, and a shaft 42 whose both ends are fixed to support plates 41 are contained in the hollow of the shaft 8, whereby the flexure of the shaft 8 is detected in the interior of the shaft 8. As illustrated in detail in FIG. 14, one or more gap sensors 72 are fixed to the shaft 42, and the gap sensor or sensors are opposed to the inner periphery of the hole of the shaft 8 at a predetermined spacing therefrom. Here, when the shaft 8 flexes due to the tension of the strip or becomes eccentric due to the play of the roller bearing 14, the distance between the inner periphery of the hole of the shaft 8 and the gap sensor 72 changes, so that the quantity of flexure or eccentricity of the shaft 8 can be detected. The detected value may be processed by the arithmetic unit 53 similarly to the detected values obtained with the gap sensors 71 in FIG. 5, and given to the arithmetic unit 51 as a shape correcting signal. With the present embodiment, accordingly, the flexing component of the shaft 8 is subtracted from the quantity of flexure of the spring means 20 including the flexure of the shaft 8, and the true quantity of flexure of the spring means ascribable to the component of the tension of the strip can be detected, and the shape detecting performance is enhanced.

Figure 15:
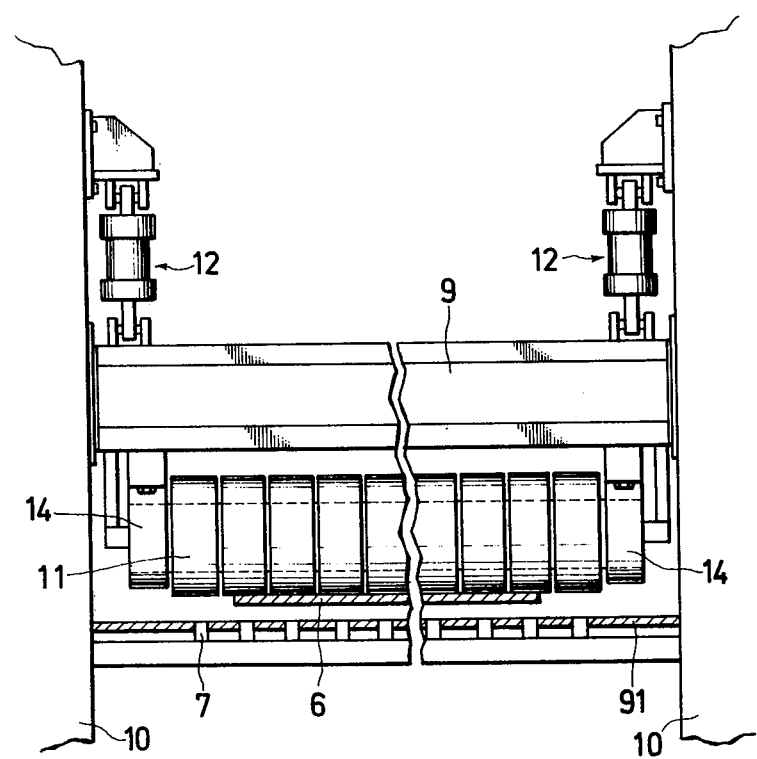
FIG. 15 is a front view of a shape detector which is a seventh embodiment of this invention.

In the above, description has been made of the embodiments wherein the components of the tension are detected by pressing the rings 11 from below against the strip surface. Needless to say, however, even when the rings 11 are pressed down against the surface of the strip as shown in FIG. 15, similar beneficial results are obtained. Although, in the foregoing embodiments, the gap sensors 7 are arranged on that side of the rings 11 on which they are not in contact with the strip, the arrangement is not restrictive, but the strip 6 may be passed between the gap sensors 7 and the rings 11 as illustrated by way of example in FIG. 15. In this case, there is the possibility that the strip will touch the gap sensors, and therefore the gap sensors may be buried in a plate 91.

As set forth above, according to this invention, a roller bearing or a film bearing which causes a play is not comprised between the rings contacting with the strip and the shaft penetrating the rings, and hence, the detection error can be made very small. Although the roller bearings 14 are disposed at both the ends of the shaft 8, the eccentricity of the shaft 8 which is induced by the play of the roller bearings 14 or the flexure of the shaft 8 can be easily removed from the quantity of eccentricity of the ring based on the change of the component of the tension of the strip, and the detecting precision becomes very high. When compared with the prior-art shape detector in which sensors such as load cells are contained in the rings, the apparatus of this invention has the advantage that the maintenance and inspection can be easily executed inasmuch as the sensors are located outside the rings. Further, the components of the tension of the strip are once converted into the amounts of flexures of the spring means, whereupon the amounts of flexures are detected by the gap sensors, and hence, load cells or the like means being expensive are not necessary.

We claim:

1. Apparatus for detecting the relaxed shape of a running strip while it is under tension, comprising:
   (a) a plurality of rings axially aligned adjacent each other to be arranged across the width of the strip with the outer peripheries of the rings in direct contact with a surface of the strip;
   (b) a shaft extending axially through said rings and having means supporting opposite ends of said shaft for rotation about an axis;
   (c) separate spring means fixed in and aligned over a space defined between the inner periphery of each of said rings and the outer periphery of said shaft for resiliently supporting said rings relative to said shaft, so that said rings may independently bodily move relative to said shaft radially in the direction perpendicular away from the strip so as to bodily rotate eccentrically with respect to said shaft by an amount proportional to the tension in respective portions of the strip contacting the rings; and
   (d) a corresponding plurality of gap sensing means, all fixedly mounted outside of said rings, at positions respectively opposed to the outer periphery of said rings, and for detecting the amount of the bodily eccentric movement of said rings, and said gap sensing means producing signals corresponding to said amount proportional to the tension in the strip.

2. Apparatus for detecting the shape of a strip according to claim 1, further comprising second gap sensing means arranged near both said ends of said shaft and for detecting a quantity of flexure of said shaft attributed to a load received from said strip, means for calculating quantities of flexures of respective parts of said shaft from a detection value of said second gap sensing means, and means for correcting shape detection values from said first mentioned gap sensing means by the use of calculation values of the calculating means.

3. Apparatus for detecting the shape of a strip according to claim 1, wherein said shaft has a hole which contains the axis thereof, a fixed shaft extending through said hole and secured at both its ends, at least one additional gap sensing means for detecting a gap from an inner wall of said hole is disposed in said fixed shaft, means for calculating quantities of flexures of respective parts of said shaft from a detection value of said additional gap sensing means, and means for correcting shape detection values from said first-mentioned gap sensing means by the use of calculation values of the calculating means.

4. Apparatus for detecting the shape of a strip according to claim 1, wherein said spring means is composed of a plurality of cylindrical springs, said cylindrical springs are fitted in an interspace between said each ring and said shaft, with their axes extending along the axis of said shaft and at fixed intervals, and a sectional shape of said cylindrical spring orthogonal to the axis thereof is elastically deformed into an ellipse whereby said ring becomes eccentric.

5. Apparatus for detecting the shape of a strip according to claim 2, wherein said spring means is composed of a plurality of cylindrical springs, said cylindrical springs are fitted in an interspace between said each ring and said shaft, with their axes extending along the axis of said shaft and at fixed intervals, and a sectional shape of said cylindrical spring orthogonal to the axis thereof is elastically deformed into an ellipse whereby said ring becomes eccentric.

6. Apparatus for detecting the shape of a strip according to claim 3, wherein said spring means is composed of a plurality of cylindrical springs, said cylindrical springs are fitted in an interspace between said each ring and said shaft, with their axes extending along the axis of said shaft and at fixed intervals, and a sectional shape of said cylindrical spring orthogonal to the axis thereof is elastically deformed into an ellipse whereby said ring becomes eccentric.

* * * * *